Feb. 19, 1929. 1,702,448
R. A. McCARTY
MAGNETIC CORE
Filed March 2, 1926 2 Sheets-Sheet 1

INVENTOR
Roy A. McCarty.

Patented Feb. 19, 1929.

1,702,448

UNITED STATES PATENT OFFICE.

ROY A. McCARTY, OF WILKINSBURG, PENNSYLVANIA, ASSIGNOR TO WESTINGHOUSE ELECTRIC & MANUFACTURING COMPANY, A CORPORATION OF PENNSYLVANIA.

MAGNETIC CORE.

Application filed March 2, 1926. Serial No. 91,749.

My invention relates to dynamo-electric machines and it has particular relation to the design of the laminated stator cores of such machines as are provided with heavy stator supporting frames, with the object of preventing wrinkling of the laminations of the core due to expansion as a result of heating.

My invention is particularly designed for large vertical generators of some 10000 kva. capacity in which particular difficulty had been experienced because of the wrinkling of the armature iron due to thermal expansion. The wrinkling just mentioned was very noticeable in the large generators in question, since the departure from a straight line, at various points of the core, amountetd to from three-eighths inch to one-half inch.

After trying various remedies, I have found that the trouble just described can be substantially eliminated by subdividing the armature core into a large number of separated segments, so that, when the core becomes heated, the segments may come together without buckling.

Figure 1:
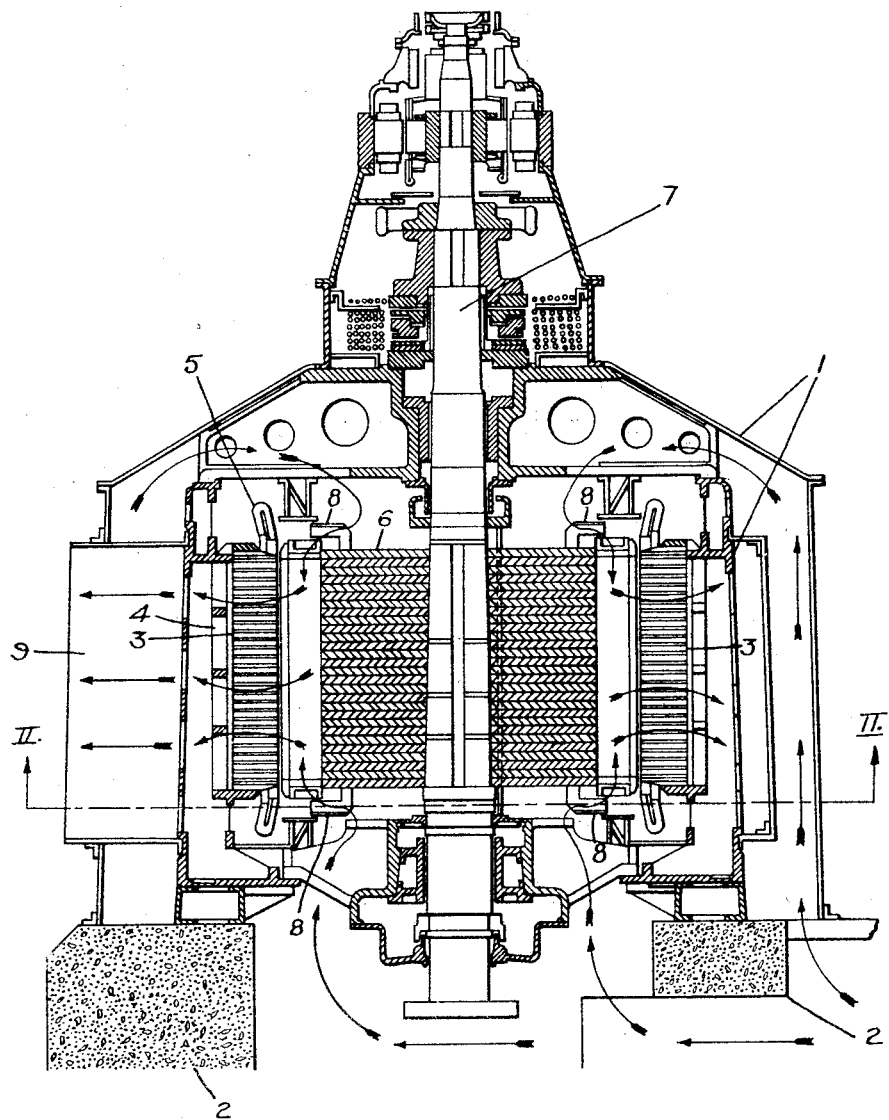
Figure 2:
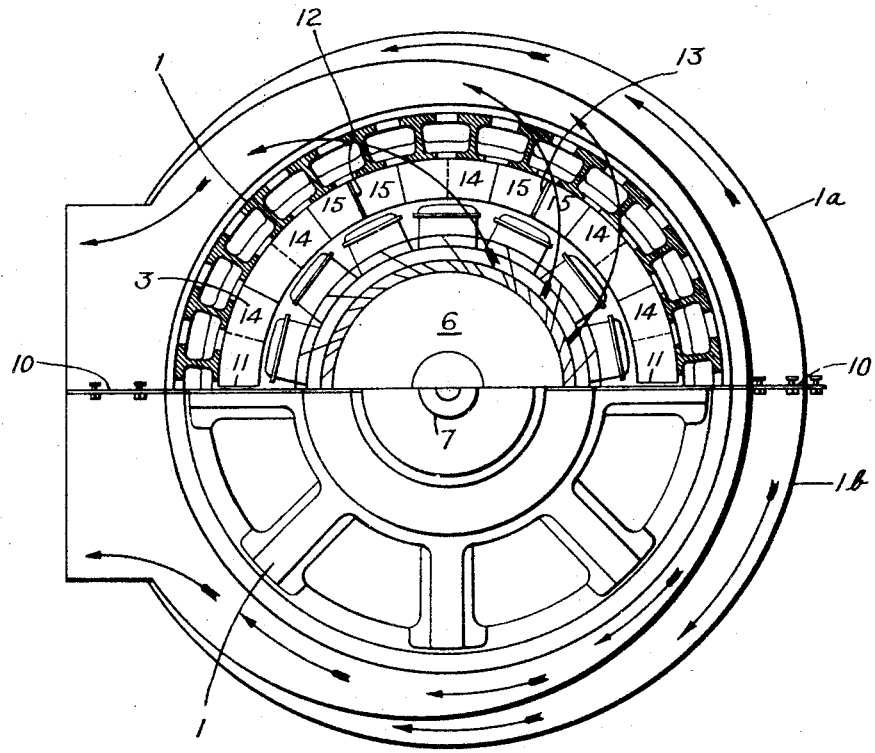

My invention may best be understood by reference to the accompanying drawing, wherein Figure 1 is a vertical sectional view of a vertical generator of the type to which my invention is applicable, and Fig. 2 is a partial sectional view thereof, on the line II—II of Fig. 1, showing the subdivision of the armature core in accordance with my invention.

The vertical generator shown in the drawing comprises a stator supporting frame 1 which is mounted on a concrete foundation 2, a built-up laminated magnetizable stator core 3 supported within a circular opening 4 in the stator frame, stator windings 5 supported by the stator core, and a salient-pole rotor member 6 disposed within the stator core 3 and mounted upon a shaft 7. The rotor member is provided with fans 8 for drawing the ventilating air through the machine, said air entering at the bottom of the machine and passing out through a discharge duct 9 in the side of the stator frame, as clearly indicated by the arrows.

In machines such as the one just described, the stator frame 1 is relatively rigid, and being of open construction and well ventilated, it is maintained at a relatively low temperature throughout the operation of the machine. The laminated stator core 3, on the other hand, is relatively weak mechanically and it is subject to much higher extremes in temperature, with the result that when the laminated core expands, the hereinbefore described wrinkling of the laminations is produced.

The stator frame 1 is usually constructed in two halves or segmental sections 1ª and 1ᵇ which are joined together at two vertical joints as indicated at 10 in Fig. 2. For convenience in assembly, the laminated stator core 3 is also provided with joints 11 alined with the joints 10 of the stator frame, the core joints 11 consisting simply of abutting segments of the laminations which are separated about one thirty-second of an inch when cold, and which come together when hot.

It is necessary, however, to further subdivide the core member in order to prevent wrinkling of the laminations, and to this end similar joints are provided, as shown at 12 and 13 in Fig. 2, at intermediate points between the joints 10 in the stator frame, said intermediate core joints consisting simply of abutting segments of the laminations which are separated about one thirty-second of an inch when cold, and which come together when hot.

The joints or subdivisions 11, 12 and 13 of the laminated core should be distinguished from the overlapping sectional construction which is commonly utilized in large machines and which is also shown in Fig. 2 of my drawing, wherein the core 3 is shown as being built up of a plurality of relatively short sections 14 and half sections 15 which are disposed so that alternate joints are staggered, with adjacent segments overlapping one another.

A plurality of the staggered sections just described may be comprised within the segmental unit of the core, between any two of the core joints such as 11 and 13. The staggered sections 14 and 15, by reason of their overlapping construction, constitute a rigid mechanical unit, whereas the sectionalizing joints 11, 12 and 13, extending longitudinally throughout the core member, divide the latter into mechanically separate segments, as hereinbefore described.

It has been found, in testing the machines constructed in accordance with the hereinabove described invention, that the remedy thus provided is quite effective, since the wrinkling of the core has been reduced to such extent as to be fully satisfactory.

I claim as my invention:

1. A dynamo-electric machine having a stator member comprising an integral frame member and a laminated magnetizable core disposed within said frame member and supported thereby, said laminated core being subdivided into a plurality of arcuate sections which are separated when cold and in contact when hot.

2. A dynamo-electric machine having a stator member comprising a relatively rigid frame comprising a plurality of arcuate members joined together, said frame having a circular opening, a built-up laminated magnetizable core of relatively small rigidity disposed within the circular opening of said frame and supported thereby, said laminated core being subdivided into separated sections at the joints in said frame, and said laminated core being further subdivided into separated sections at other points between the joints in said frame, whereby buckling of the laminations due to expansion when heated is substantially prevented.

3. A dynamo-electric machine having a stator member comprising a frame, means for maintaining the frame at a relatively low temperature under all conditions of operation, said frame having a circular opening, a laminated magnetizable core disposed within said circular opening of the frame and supported thereby, stator windings supported by said laminated core, and means for providing for a more rapid expansion of said laminated core than said frame due to heating during the operation of the machine, whereby wrinkling of the core laminations is substantially prevented.

4. A dynamo-electric machine having a stator member comprising an integral frame member and a laminated magnetizable core disposed within said frame member and supported thereby, said laminated core being subdivided into a plurality of arcuate sections which are separated when cold and in contact when hot, each of said arcuate sections comprising relatively short punchings of staggered laminations held together as a substantially rigid mechanical unit, the spaces separating said arcuate sections extending longitudinally through the machine in such manner as to cause said arcuate sections, into which the magnetizable core is subdivided, to be mechanically separated.

In testimony whereof, I have hereunto subscribed my name this first day of March, 1926.

ROY A. McCARTY.